United States Patent [19]

Lehmann

[11] Patent Number: 5,760,294
[45] Date of Patent: Jun. 2, 1998

[54] METHOD OF AND APPARATUS FOR CHECKING THE VOLUME OF CONTAINERS

[76] Inventor: Martin Lehmann, Obere Farnbuhlstr. 1, 5610 Wohlen, Switzerland

[21] Appl. No.: 605,646

[22] Filed: Feb. 22, 1996

Related U.S. Application Data

[62] Division of Ser. No. 241,698, May 12, 1994, Pat. No. 5,535,624, which is a continuation of Ser. No. 709,279, Jun. 3, 1991, abandoned.

[30] Foreign Application Priority Data

Jun. 2, 1990 [DE] Germany .................... 40 17 853.6

[51] Int. Cl.$^6$ ........................................... G01M 3/10
[52] U.S. Cl. ........................ 73/49.2; 403/51; 220/720
[58] Field of Search ............... 403/51, 50; 73/37, 73/149, 290 B, 49.2 T, 49.2 R, 49.3; 220/720

[56] References Cited

U.S. PATENT DOCUMENTS

| | | | |
|---|---|---|---|
| 2,168,106 | 8/1939 | Saur | 73/290 B |
| 3,402,602 | 9/1968 | De Castelet | 73/149 |
| 3,596,510 | 8/1971 | Siegel et al. | 73/149 |
| 3,744,306 | 7/1973 | Krueger | 73/149 |
| 3,895,472 | 7/1975 | Steinhauer et al. | 52/743 |
| 3,895,519 | 7/1975 | Bouchy et al. | 73/149 |
| 3,962,916 | 6/1976 | Bouchy et al. | 73/149 |
| 3,978,710 | 9/1976 | Ratajski | 73/49.3 |
| 3,982,400 | 9/1976 | Benkert | 405/36 |
| 4,354,383 | 10/1982 | Hoxtel | 73/290 B |
| 4,430,891 | 2/1984 | Holm | 73/149 |
| 4,553,431 | 11/1985 | Nicolai | 73/149 |
| 4,640,122 | 2/1987 | Heroud et al. | 73/149 X |
| 4,708,014 | 11/1987 | Janitz | 73/49.2 R X |
| 4,720,995 | 1/1988 | Tkiel | 73/149 |
| 4,750,634 | 6/1988 | Herman | 220/720 |

(List continued on next page.)

FOREIGN PATENT DOCUMENTS

| | | | |
|---|---|---|---|
| 0313678 | 5/1989 | European Pat. Off. | |
| 1931583 | 12/1970 | Germany | 73/290 B |
| 2534953 | 2/1976 | Germany | 73/149 |
| 3315238 | 10/1984 | Germany | |
| 3630078 | 3/1988 | Germany | |
| 75221 | 4/1986 | Japan | 73/149 |
| 235727 | 10/1986 | Japan | 73/149 |
| 251718 | 10/1986 | Japan | 73/149 |
| 499400 | 1/1939 | United Kingdom | 73/290 B |
| WO80/02196 | 10/1980 | WIPO | |

OTHER PUBLICATIONS

"Cheromatographie in der Gasphase" by Rudolf Kaiser—Bibliographisches Institut–Mannheim, 1961 pp. 42–43.
"Moderne Messmethoden Der Physik" by Franz X. Eder, Hochschulbucher fur Physik Herausgegben von Robert Rompe und Ernst Schmutzer—Band 1, 1968, p. 132.
Abstract of cited German patent 3,315,238.
Abstract copyright 1985 by Derwent Publications, LTD.
"Air Tightness Measuring Device for Prefabricated Building" Patent Abstracts of Japan; Inventor Ishihara; Grp P1415, vol. 16, No. 424; Abstract Pub. Date Sep. 7, 1992 (4–145339).

Primary Examiner—Thomas P. Noland
Attorney, Agent, or Firm—Antonelli, Terry, Stout & Kraus, LLP

[57] ABSTRACT

A method of checking the volume of containers is disclosed according to which a gas is fed into a volume which is correlated to the volume of the respective container and a signal which depends from the fed amount of gas is evaluated as signal indicative of the volume of the container. In order to substantially reduce the time of the measuring cycle at such a method a gas is fed to the volume which is correlated to the volume of the container at a controlled flow, i.e. the mass flow of the gas per unit of time is pre-set in a controlled manner such that it is possible to drastically reduce the time spans during which it is necessary to wait due to transient processes and a chamber which must be loaded in advance will become superfluous.

12 Claims, 2 Drawing Sheets

U.S. PATENT DOCUMENTS

| | | | |
|---|---|---|---|
| 4,808,161 | 2/1989 | Kamen | 73/149 X |
| 4,852,415 | 8/1989 | Bogatzki et al. | 73/865.8 |
| 5,074,146 | 12/1991 | Orr et al. | 73/149 |
| 5,098,221 | 3/1992 | Osborne | 73/49.2 X |
| 5,228,330 | 7/1993 | Linn et al. | 73/49.3 X |
| 5,231,873 | 8/1993 | Lindberg | 73/149 |
| 5,265,464 | 11/1993 | Caron et al. | 73/37 X |
| 5,333,492 | 8/1994 | Aarts | 73/49.3 |
| 5,495,748 | 3/1996 | Brede et al. | 73/49.2 R |

METHOD OF AND APPARATUS FOR CHECKING THE VOLUME OF CONTAINERS

This application is a division of application Ser. No. 08/241,698, filed May 12, 1994, now U.S. Pat. No. 5,535,624, which in turn is a continuation application of application Ser. No. 07/709,279 filed Jun. 3, 1991, and now abandoned.

BACKGROUND OF THE INVENTION

1. Field of the Invention

The present invention relates to a method of checking the volume of containers in which a gas is fed into a volume which is correlated to the volume of a respective container and a signal which depends from the supplied amount of gas is evaluated as signal indicative of the volume of the container.

The present invention also relates to an apparatus for checking the volume of containers by a source of pressurized gas and a connecting line extending from the source into a vessel of which the volume is correlated to the volume of the container to be checked.

The invention relates, furthermore, to a connector for containers.

2. Description of the Prior Art

The European Patent Specification EP-A-O 313 678 discloses a method in which, aside from the checking regarding the tightness of containers, a signal is evaluated which depends upon the volume of the container being checked. A container to be checked is placed into a checking chamber wherein the volume difference between the checking chamber and the container to be checked forms a volume which depends from or is correlated with respect to the volume of the container. This volume is acted upon by a pressurized gas from a pre-charged storage chamber by opening a valve arranged in a connecting line, and the ratio of the pressures ahead of the opening of the valve and after the opening of the valve provides an indication of the volume of the container, due to the decompression of the pressure from the pre-charged chamber into the checking chamber.

The disadvantage of this method is that, due to the sudden decompression of the pressurized gas from the precharged storage chamber into the checking chamber, relatively long time periods must elapse until transient processes of the equalizing of the pressure have been damped, for example caused at the one side by the sudden decompression of the gas and the thereby occurring uncontrollable gas flow and at the other side by the time dependent yielding of the wall of the container to be checked.

It is additionally necessary, when proceeding from one checking to a subsequent checking to always recharge the chamber up to a preselected pressure before the subsequent checking can be initiated. This also increases the time period of a measuring cycle.

SUMMARY OF THE INVENTION

It is an object of the present invention to provide a method and apparatus by which the time of a measuring cycle for checking a volume of containers can be considerably reduced.

A further object of the present invention is to provide a method which encompasses a feeding of gas at a controlled flow into the volume which is correlated to the volume of the container.

Due to the fact gas that is fed to the volume which is correlated to the volume of the container at a controlled flow, i.e. that the mass flow of the gas per unit of time is pre-set in a controlled manner, it is possible to drastically reduce the time periods which must elapse in order to allow a relevant measuring in view of transient processes and, additionally the provision of a chamber which must be pre-charged will become superfluous, whereby the checking by acting upon the mentioned volumes which are correlated to the volume of the container may be rapidly sequentially carried out without any preparing phase and without any loss of time.

For the checking of volumes of containers during a series or in line production of the containers, for example plastic containers, it is a further object of the invention to provide a method according to which gas is fed into the container itself by which the inner volume of the container acts as the above mentioned volume which is correlated to the volume of the container.

Yet a further object of the present invention is to provide a method wherein a time period until the pressure in the volume which is correlated to the volume of the container has reached a predetermined value is measured as indicative signal, this obviously at a given mass flow of the gas fed to mentioned volume during this time period.

By pre-setting the pressure value to be reached, the time consumed at each measuring cycle can be reduced further in that already, at a relatively small overpressure, the amount of gas which has until that time been fed to the mentioned volume is already relevant for the respective volume to be checked.

A further object of the present invention is to provide a method wherein the fed amount of gas until reaching a predetermined pressure or which amount thereof flows during a predetermined time span into the volume which is correlated to the volume of the container is measured.

Yet a further object of the present invention is to provide a method wherein the pressure, after a predetermined time period is measured.

A further object of the invention is to provide an apparatus of the aforementioned type in which the source is adapted to deliver a pre-settable amount of gas per unit of time.

Because the source delivers a pre-settable amount of gas per unit of time and no chamber is suddenly discharged into the volume to be checked by a step like opening of a valve, it will be basically possible to avoid transient processes such as appear at a sudden gas pressure discharge, and therefore to eliminate the time periods needed for the dampening of such processes. Furthermore, it is no longer necessary to have a storage source which is pre-charged to a predetermined pressure and including the previously necessary pre-charging time period.

The vessel is thereby preferably formed by the container itself, and a connector is foreseen for a sealed connecting of the container to the connecting line. In this way it is possible to check one or more containers, such as, for example, plastic bottles during their in-line production and specifically not only by a random checking but, such as mentioned, all containers coming from the production line and thereafter forwarded further.

A further object is to provide an apparatus which comprises a time measuring device and a pressure sensor of the vessel or at the connecting line, whereby the output of the pressure sensor is led to a comparator, which time measuring device is adapted to be started by an initiating signal of the comparator and is adapted to produce an output signal, which out-put signal is the output signal of the checking procedure.

Still a further object is to provide an apparatus which has a through flow rate measuring device arranged at the connecting line adapted such that its output, controlled by a time setting unit or by the output of a pressure comparator unit, is issued as an output signal of the checking procedure.

Yet a further object is to provide an apparatus including a pressure measuring device arranged at the vessel or at the connecting line of which the output signal, controlled by a time setting unit, is issued as output signal of the checking procedure.

A further object is to provide an apparatus for a simultaneous checking of a plurality of containers which additionally comprises a plurality of simultaneously operated connectors.

In the context which here is of interest it must be borne in mind that in order to check the volume of containers, such as, for example bottles, whereby the container is directly used as the vessel, the connections for the feeding of gas must be adjusted to the respective possibly bulging shapes of the containers at the general area of their openings.

In order to obtain a large flexibility in this respect without a refitting and mounting respective suitable connections, it is a further object of the invention to provide a connector for containers which includes a connector casing having at least one connection for a line opening thereinto, and at least one pneumatically operated elastically flexible bellows located at the casing and adapted to apply the connector within limits independently from the shape of the section of the container to be connected in a sealed state onto the outer wall of the container. Although such a connector can also be used for other processes such as, for example for the filling of containers, it is specifically used in combination with the inventive apparatus and generally for in line bottle testing.

BRIEF DESCRIPTION OF THE DRAWINGS

The invention will be better understood and objects other than those set forth above will become apparent when consideration is given to the following detailed description thereof. Such description makes reference to the accompanying drawings wherein.

DESCRIPTION OF THE PREFERRED EMBODIMENTS

Figure 1A:
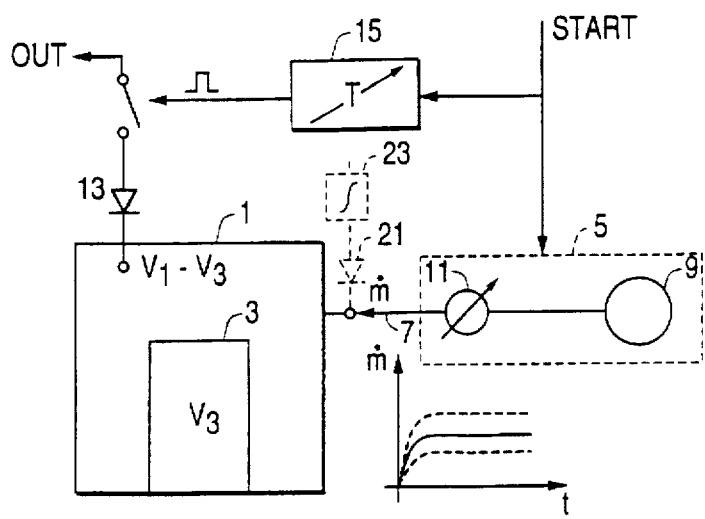
FIG. 1a is a schematic view of an apparatus constructed in accordance with the invention, in which the volume which is correlated to the volume to be checked is taken as the volume of a checking chamber.

FIG. 1a schematically illustrates a checking chamber 1 wherein a closed container 3, possibly filled by its contents, is placed into the checking chamber 1. The setting of the container 3 to be checked and having a volume $V_3$ into the checking chamber 1, due to which the differential volume $V_1-V_3$ is produced in the chamber proceeds by a charging gate which can be closed in a completely sealed manner and is not particularly illustrated.

A source 5 of pressurized gas is connected via a connecting line 7 to the chamber 1. As shown in FIG. 1, the source 5 allows a controlled setting of the mass flow $\dot{m}$ of the gas which is fed per unit of time via the line 7 to the volume $V_1-V_3$, such as a setting to respective constant values. For this task and, by example, a storage tank 9 is provided for the pressurized gas and a control member 11 regulated by the through mass flow, such as, for example a constantly adjustable valve.

This extremely simple volume testing apparatus operates in a manner described more fully hereinbelow with reference to FIGS. 1b to 1e.

After the respective volume or container 3 to be tested is located in the checking chamber 1, the flow of a predetermined mass flow $\dot{m}$ of gas is set by the source 5 which is controlled regarding the mass flow in, for example by the continuously adjustable valve 11. The pressure $P_1$-3 in the volume difference $V_1-V_3$ rises during the time period. This pressure is sensed by a pressure sensor 13.

Simultaneously, with the beginning of the operation or opening of the valve 11, a timing unit 15 is started which after a pre-settable time period T, outputs or forwards further, the output of the pressure sensor 13 for the further evaluation and thus a evaluation signal indicative of the checking.

Figure 1B:
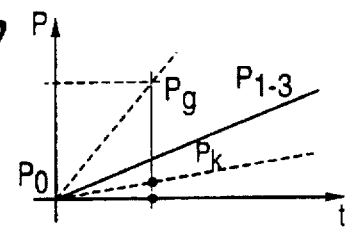
FIG. 1b is a graphical illustration on a qualitative of the course of the pressure in the checking chamber if a substantially constant mass flow of gas is fed there-into for the explanation of an evaluation signal of a first variant.

According to the illustration of FIG. 1b the pressure attained in the checking chamber 1 with the volume difference $V_1-V_3$ after the pre-settable time period T will reach a higher value $P_g$ at a larger volume $V_3$ and a lower value $P_k$ at a smaller volume $V_3$.

Thus, the pressure attained in the differential volume or in the volume which is correlated to the volume $V_3$ to be checked, after the pre-settable time period T, is evaluated as an evaluation signal for the volume test.

Figure 1D:
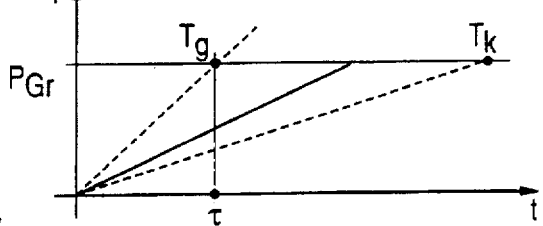
FIG. 1d is a graphical illustration similar to the graphical illustration of FIG. 1b for the explanation of a further variant of the preparation for the evaluation signal.
Figure 1C:
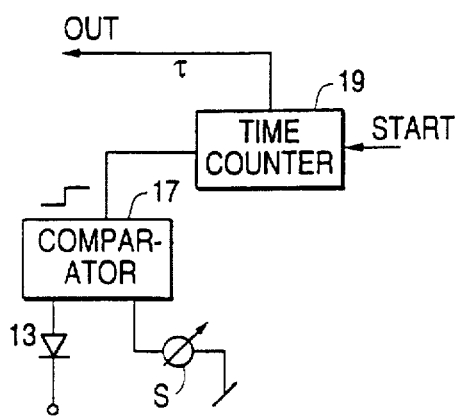
FIG. 1c is a schematic view of an alternate embodiment in accordance with the present invention.

According to a second variant of the evaluations, as illustrated in FIG. 1c, a predetermined and adjustable pressure value $P_{Gr}$ is set instead of a pre-set time period. To this end and, as shown in FIG. 1c, the output of the pressure sensor 13 is connected to a comparator 17 and a signal S which corresponds to the pressure $P_{Gr}$ is inputted as a reference value into the comparator 17. By the starting signal, which was explained by reference to FIG. 1a, the time counter 19 is started and then stopped by the output signal of the comparator 17, i.e. at the time when the pressure measured at the sensor 13 reaches a value S which corresponds to the pre-settable pressure threshold value $P_{Gr}$. The time value $\tau$ taken at the counter 19 is then evaluated as a volume indicating signal.

As shown in FIG. 1d at a larger volume $V_3$ to be tested, the time period $\tau_g$ is shorter than in case of a smaller volume tested where the time period such as illustrated qualitatively increases with $\tau_k$.

Figure 1E:
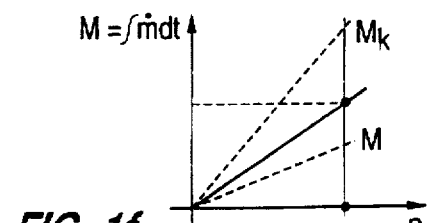
FIG. 1e is a graphical illustration the mass of gas flow flown in correlation with the pressure in the gas chamber, for the illustrating of a further variant of the preparation for the evaluation signal.

FIG. 1e illustrates a further variant of preparing a checking signal. By a sensor 21, the amount of gas, the mass or volume, respectively flow $\dot{m}$ fed per unit of time to the differential volume $V_1-V_3$ is measured and integrated at the integration unit 23 over the time period, whereby the amount of gas which has flowed from the starting of the measuring cycle is detected.

Now, according to FIG. 1e again a limit or threshold value $P_{Gr}$ is pre-set and the amount of gas is measured which has flowed from the start of the measuring cycle up to reaching this limit pressure. If the volume 3 to be checked is larger the amount of gas $M_g$ which has flowed until reaching the limit pressure is smaller than in case of a smaller volume to be checked, such as illustrated by $M_k$. The reaching of the limit pressure $P_{Gr}$ according to FIG. 1e is achieved, for example, by a pressure sensor 13 and a comparator 17 switched in following the sensor 13 and by pre-setting the limit pressure $P_{Gr}$ such as shown in FIG. 1c.

Figure 1F:
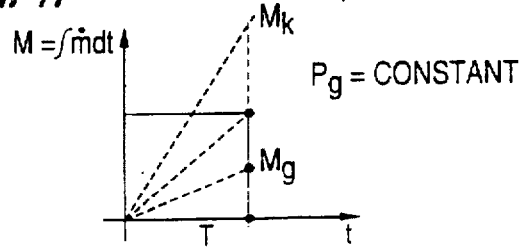
FIG. 1f is a graphical illustration of a relationship of the time to the mass of gas which has flown since the beginning of the measuring cycle for explaining of a further variant of the preparation for the evaluation signal.

FIG. 1f illustrates a further variant of preparing an evaluation signal. A pre-set measuring period or cycle T is set and the amount of gas is measured which has flowed after the start of the measuring cycle. During the pre-set time period T, at a constant delivery pressure of the source 9 and at a delivered amount $\dot{m}$ per unit of time which, therefore, depends from the delivery pressure $p_g$ and the pressure in the differential volume, a lower amount of gas flows into the differential volume $V_1-V_3$ at a larger volume $V_3$ to be checked, such as illustrated schematically by $M_g$. Analogous thereto, at a smaller volume $V_3$ to be checked, the amount $M_k$ of gas which is fed within the time span T is larger.

The amount of gas which has flowed from the start of the measuring cycle is sensed, for example again by the sensor 21 illustrated in FIG. 1a and the integrator 23 coupled at the output side thereof.

Figure 2:
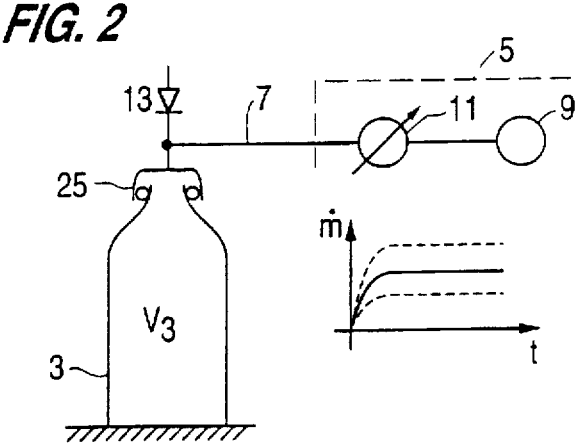
FIG. 2 is a schematic view analogous to FIG. 1a and of a variant of an embodiment of the inventive apparatus, in which the volume which is correlated to the volume to be checked is taken directly as the volume of a container to be checked.

In FIG. 2, the apparatus which is analogous to the apparatus of FIG. 1a is shown, when the volume which is correlated to the volume to be checked is formed directly by the inner volume $V_3$ of the container to be checked, such as, for example, a plastic bottle. Here the possibly installed pressure sensor of FIG. 1a is arranged directly at the delivery line 7 between a connector 25 for a tight sealed connecting of the line 7 to the opening of the container 3. In contrast to the variant of the embodiment of FIG. 1a, the container here is an open container such as a plastic bottle which just has been produced.

The procedure and the technique of evaluation remain the same, as explained in connection with FIG. 1a.

Figure 3:
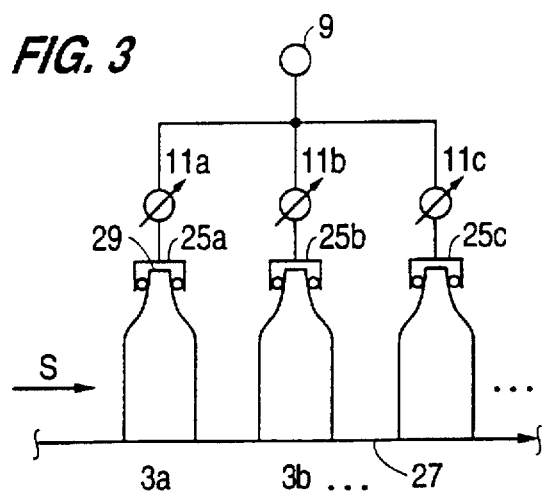
FIG. 3 is a schematic view analogous to the illustration of FIG. 2, depicting the checking of groups of containers arranged in line during the production of the containers.

A further, technique such as schematically illustrated in FIG. 3 is extraordinarily advantageous and suitable for a checking of containers 3a, 3b, etc. which are supplied at a continuous in-line production fashion and just have been produced, whereby the checking of the volume is either made via flexible connections during the moving of the containers, for example on a conveyor belt 27, or when an intermittently driven conveyor belt or correspondingly driven conveyor apparatus is present, where one container or such as shown in FIG. 3, preferably, a plurality of containers, are simultaneously subjected to the volume testing.

Figure 4:
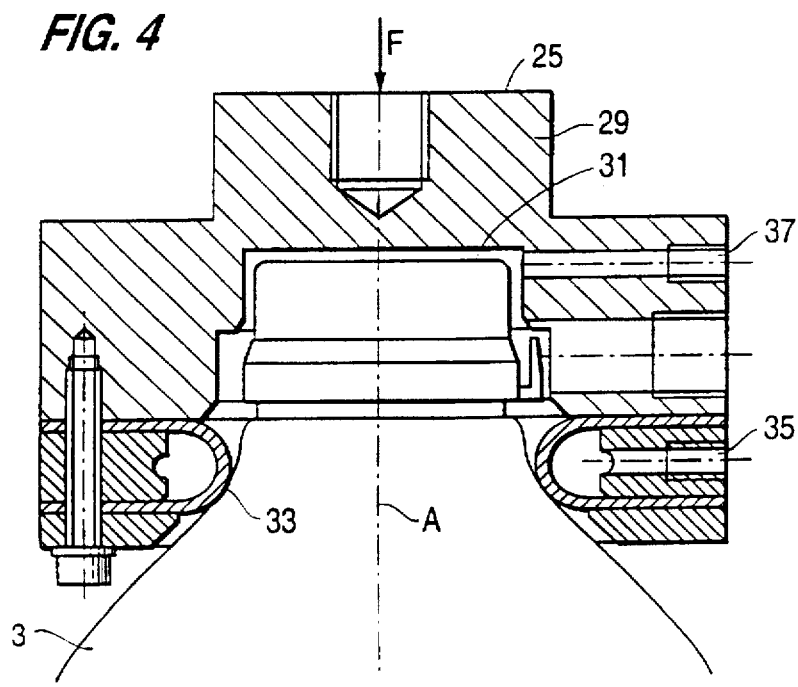
FIG. 4 is a partial longitudinal cross-sectional view through a connector for containers constructed in accordance with the invention, specifically also used in the embodiments of the invention according to FIGS. 2 and 3 for the inventive volume checking method and the inventive volume checking apparatus, respectively.

In order to solve at the procedures according to FIGS. 2 and 3, sealing difficulties in case of deviations of dimensions and shapes of the opening areas 29 of the containers to be controlled which may, for example occur due to production tolerances or then in order to be able to control various containers at a production line without any adjusting procedures, it is suggested to construct the connector 25 according to FIGS. 2 and 3 in the manner illustrated in FIG. 4. Accordingly, a connector structured in accordance with the invention includes a casing 29, for example metal or plastic, having a recess 31 for receiving the opening area of the container 3 to be checked, for example of a bottle neck of a plastic bottle.

A circumferentially extending bellows 33 is mounted at the lower area of the recess and coaxially to an axis A of the recess, which bellows 33 is made of a rubber elastic material, and conduits for a pressurized medium are located at one or a plurality of locations 35 which open into the bellows, whereby such medium is preferably a pressurized gas.

A connector in accordance with the invention further includes, a supply line 37 which opens into the recess 31 and which is connected if the inventive connector is used for volume checking purposes according to FIGS. 2 and 3, to the gas feed connecting line 7.

By inflating the bellows 33, the connector 25 is placed at its lower area in a sealed manner onto the opening area or the bottle neck of the respective container 3 to be checked. That is, inflation of the bellows causes the bellows to swell out or distend, e.g. extend in radial direction with respect to axis A, into sealing contact with the bottle neck as shown in FIG. 4. A tightly sealed seat is arrived at, within large limits independent from the specific bulging shape or dimension of this opening area. When applying the connector 25, it is preferred to apply a pressure F onto the connector 25 which pressure F is transmitted via the container 3 to be checked onto its respective supporting base such that, upon an inflating and sealed placing of the bellows 33 onto the outer small surface of the container 3 to be checked, no yielding in a direction of the axis A of the connector 25 or container 3 can occur.

According to the described procedure it is possible to make a volume checking of closed or opened containers in that the evaluation signals illustrated in the drawings and described above may be, such as herein not specifically entered into but quite obvious to the person skilled in the art, be subjected in a further generally known procedure can be classified. Furthermore, depending upon whether the evaluation signals are to high or to low or to large or to small, a respective container which is checked is rejected as not acceptably large or not acceptably small.

By a controlling of the amount of gas fed per unit of time to the respective volumes, time period which must pass within which one must wait for a pressure equalization until a relevant measuring is possible are no longer necessary.

By the connector suggested in accordance with the invention it is possible to contact in a sealed manner containers having variously shaped or dimensioned opening areas within a large range, such as bottle necks, and, for example for filling the same or in connection with a checking of the volume in order to act upon the containers by means of checking gas.

While there are shown and described present preferred embodiments of the invention, it is to be distinctly understood that the invention is not limited thereto, but may be otherwise variously embodied and practiced within the scope of the following claims. Specifically to be noted is that all claimed embodiments relating to the method and apparatus for checking singly checked containers are equally applicable for an in-line checking specifically of plastic bottles.

I claim:

1. A connector for sealingly gripping a wall section of a substantially cylindrical part of a container, defining a container opening, comprising a connector casing to be applied around said wall section of the container, and at least one pneumatically operated elastically flexible annular bellows arrangement mounted to said casing about a central axis of said annular bellows arrangement, said annular bellows arrangement being pneumatically inflatable in radial direction with respect to said axis so as to be brought into sealing contact with said wall section, independently within limits of the dimensioning and the shape of said wall section.

2. A connector according to claim 1, wherein said connector casing includes at least one connection for a gas line opening thereinto.

3. A connector according to claim 1, wherein said connector casing is ring-shaped with said at least one flexible annular bellows mounted thereto so as to be applied from the exterior of said wall section of said container.

4. A connector according to claim 1, wherein said connector casing includes a recess for receipt of said wall section of a substantially cylindrical part of the container defining the container opening, and wherein said at least one flexible annular bellows arrangement extends circumferentially about said recess.

5. A connector according to claim 4, wherein said recess is shaped to receive a bottle neck of a bottle as said container.

6. An apparatus for checking containers, the apparatus comprising a source of pressurized gas, a connecting line extending from said source of pressurized gas to a container to be checked, said connecting line comprising a connector for sealingly gripping a wall section of a substantially cylindrical part of said container, defining a container opening, said connector comprising a connector casing to be applied around said wall section of the container, and at least one pneumatically operated elastically flexible annular bellows arrangement mounted to said casing about a central axis of said annular bellows arrangement, said annular bellows arrangement being pneumatically inflatable in radial direction with respect to said axis so as to be brought into sealing contact with said wall section, independently within limits of the dimensioning and the shape of said wall section.

7. An apparatus according to claim 6, wherein said connector casing includes at least one connection for a gas line opening thereinto.

8. An apparatus according to claim 6, wherein said connector casing includes a recess for receipt of said wall section of a substantially cylindrical part of the container defining the container opening, and wherein at least one flexible annular bellows arrangement extends circumferentially about said recess.

9. An apparatus according to claim 8, wherein said recess is shaped to receive a bottle neck of a bottle as said container.

10. A connector for sealingly gripping a wall section of a container defining a container opening, comprising a connector casing to be applied around said wall section of the container, and at least one flexible sealing means mounted to said casing so as to extend about a central axis of said flexible sealing means, said flexible sealing means being extendable in radial direction with respect to said axis so as to be brought into sealing contact with said wall section, independently within limits of the dimensioning and the shape of said wall section.

11. An apparatus for checking containers, the apparatus comprising a source of pressurized gas, a connecting line extending from said source of pressurized gas to a container to be checked, said connecting line comprising a connector for sealingly gripping a wall section of a part of said container defining a container opening, said connector comprising a connector casing to be applied around said wall section of the container, and at least one flexible sealing means mounted to said casing about a central axis of said flexible being sealing means, said flexible sealing means extendable in radial direction with respect to said axis so as to be brought into sealing contact with said wall section, independently within limits of the dimensioning and the shape of said wall section.

12. An apparatus according to claim 6, wherein said connector casing is ring-shaped with said at least one flexible annular bellows mounted thereto so as to be applied from the exterior of said wall section of said container.

* * * * *